United States Patent
Tendo

(10) Patent No.: US 6,751,761 B1
(45) Date of Patent: Jun. 15, 2004

(54) METHOD AND APPARATUS FOR TESTING NETWORK, AND RECORDING MEDIUM

(75) Inventor: Shigeaki Tendo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/600,484

(22) PCT Filed: Feb. 15, 1999

(86) PCT No.: PCT/JP99/00639

§ 371 (c)(1),
(2), (4) Date: Jul. 18, 2000

(87) PCT Pub. No.: WO99/41889

PCT Pub. Date: Aug. 19, 1999

(30) Foreign Application Priority Data

Feb. 16, 1998 (JP) .......................................... 10-032728

(51) Int. Cl.⁷ .......................... G01R 31/28; H02H 3/05; H04B 1/56
(52) U.S. Cl. .............................. 714/716; 714/4; 370/249
(58) Field of Search ............................... 714/4, 31, 37, 714/38, 39, 43, 44, 51, 57, 712, 716, 715; 709/1, 224; 370/242, 245, 248, 249, 466

(56) References Cited

U.S. PATENT DOCUMENTS

| | | | | |
|---|---|---|---|---|
| 5,511,163 A | * | 4/1996 | Lerche et al. | 714/28 |
| 5,778,189 A | * | 7/1998 | Kimura et al. | 709/236 |
| 5,838,518 A | * | 11/1998 | Frater | 360/244.5 |
| 5,862,362 A | * | 1/1999 | Somasegar et al. | 703/21 |
| 5,951,645 A | * | 9/1999 | Goto | 709/230 |

FOREIGN PATENT DOCUMENTS

| | | |
|---|---|---|
| JP | 63-301648 | 12/1988 |
| JP | 4-56445 | 2/1992 |
| JP | 6-96040 | 4/1994 |
| JP | 9-265462 | 10/1997 |

* cited by examiner

Primary Examiner—Christine T. Tu
(74) Attorney, Agent, or Firm—Staas & Halsey LLP

(57) ABSTRACT

The present invention relates to a node connection test method and a recording medium by which a test can be carried out in a system having a plurality of nodes (network connecting devices such as personal computers and workstations) connected to a network such as a LAN (Local Area Network) or WAN (Wide Area Network). A testing program used in the method of the present invention includes two independent programs, a transmission program and a reception program. A loopback test is performed between the transmission program and the reception program, thereby confirming normality of the network.

18 Claims, 20 Drawing Sheets

FIG.13

| CODE | PROTOCOL TYPE |
|------|---------------|
| C0   | REQUEST       |
| C1   | RESPONSE      |

FIG.14

| COMMAND NAME | CODE | TESTING NODE | TESTED NODE | OPERATION |
|---|---|---|---|---|
| PROLOG | 01 | ○ → | ○ | · INSTRUCTING TO START DATA TRANSMISSION<br>· EXCHANGING PROTOCOL VERSIONS AND SYSTEM INFORMATION, AND CONFIRMING CONNECTION |
| EPILOG | 02 | ○ → | ○ | · INSTRUCTING TO END DATA TRANSMISSION |
| LOOP | 03 | ○○ ⇄ | ○○ | · THE TESTING NODE INSTRUCTS TO LOOP BACK TEST DATA<br>· THE TESTED NODE RETURNS THE TEST DATA TO THE TESTING NODE |
| MESSAGE | 04 | ○ → | ○ | · INSTRUCTING THE TESTED NODE TO DISPLAY A MESSAGE (IN A SEQUENCE BETWEEN PROLOG AND EPILOG) |
| CATCH | 05 | ○○ ⇄ | ○○ | · THE TESTING NODE SPECIFIES A DATA FORMAT<br>· THE TESTED NODE RETURNS THE DATA TO THE TESTING NODE |

FIG.15

| | CLASSIFICATION | | RETURN CODE | CONTENTS |
|---|---|---|---|---|
| NORMAL | NORMAL OPERATION NOTIFICATION | | 00 | ⇒ THE COMMAND HAS BEEN PROPERLY EXECUTED |
| ABNORMAL | PROTOCOL DATA ERROR | | 01 | ⇒ THERE IS AN ERROR IN THE PROTOCOL TYPE CODE |
| | | | 02 | ⇒ THERE IS AN ERROR IN THE COMMAND CODE |
| | | | 03 | ⇒ THERE IS AN ERROR IN THE DATA LENGTH |
| | | | 04 | ⇒ THERE IS AN ERROR IN THE DESIGNATION OF CODES IN THE DISPLAY DATA OF A MESSAGE REQUEST |
| | | | 05 | ⇒ THERE IS NO FUNCTION CORRESPONDING TO THE PROTOCOL VERSION INDICATED BY A PROLOG REQUEST, AND THE PROCESS CANNOT BE PERFORMED |
| | SEQUENCE ERROR | | 10 | ⇒ THERE IS AN ERROR IN A RECEIVED REQUEST COMMAND<br>· THE TEST START COMMAND IS NOT THE PROLOG COMMAND<br>· THE PROLOG COMMAND IS RECEIVED TWICE |
| | CANCELLING | | 20 | ⇒ AN INCIDENT OCCURS IN THE OPERATION OF THE TESTED NODE, AND THE TEST IS INTERRUPTED<br>⇒ THE TEST IS FORCIBLY INTERRUPTED. |

Req(xxxxxx) : STANDS FOR "REQUEST"
Res(xxxxxx) : STANDS FOR "RESPONSE"

Req(xxxxxx) : STANDS FOR "REQUEST"
Res(xxxxxx) : STANDS FOR "RESPONSE"

METHOD AND APPARATUS FOR TESTING NETWORK, AND RECORDING MEDIUM

TECHNICAL FIELD

The present invention generally relates to network test methods, network testing apparatuses, and recording media, and, more particularly, to a network test method, a network testing apparatus, and a recording medium, by which a test can be carried out in a system having a plurality of nodes (network connecting devices such as personal computers and workstations) connected to a computer network such as a LAN (Local Area Network) or WAN (Wide Area Network).

BACKGROUND ART

The following is a description of examples of the prior art.

FIG. 1 shows the structure of a system, and FIG. 2 shows the 7-layer model for OSI.

Conventionally, systems having a plurality of nodes (network connecting devices for personal computers, workstations, and the like) connected to a computer network have been well known.

A LAN is applied to the system shown in FIG. 1. In this system, a router 2 is connected to a main line LAN 1, and a hub 3-1 is connected to the router 2. A branch line LAN 4 is connected to the hub 3-1, and another hub 3-2 is connected to the branch line LAN 4.

A large number of nodes 5-1, 5-2, 5-3, . . . are connected to the hub 3-1. Though not shown, a large number of nodes are also connected to the hub 3-2 connected to the branch line LAN 4. In this system, the nodes are used for communication through the LAN lines.

Each of the nodes has the functions of the OSI (Open Systems Interconnection) reference model. The OSI reference model is the standard model of network protocols concerning open systems interconnection.

The functions of the OSI reference model can be represented by the 7-layer model L0 for OSI shown in FIG. 2. The 7-layer model L0 for OSI comprises an application layer L1, a presentation layer L2, a session layer L3, a transport layer L4, a network layer L5, a datalink layer L6, and a physical layer L7.

The application layer L1 is a layer for performing necessary communication in an operation by a user through application. The presentation layer L2 is a layer for conversion into data format presentable for the application layer L1. The session layer L3 is a layer for providing a function of orderly application interaction.

The transport layer L4 is a layer for establishing and releasing transport connection, multiplexing data, performing flow control and retransmission control, and the like. The network layer L5 has functions of performing path control, establishing and releasing network connection, multiplexing data, performing flow control, and dividing and combining packets. The datalink layer L6 detects an error in a bit string and restores the bit string to ensure accurate data transfer. The physical layer L7 controls an electric and mechanical interface so as to carry out bit serial transmission or parallel transmission on a physical medium such as a communication line.

In FIG. 2, "LLC" stands for logical link control, "MAC" stands for media access control, and "MAU" stands for media attachment unit.

Conventionally, to test a LAN circuit in a system (a computer network), the network connecting devices (the nodes) transmit and receive data so as to check their normality.

Also, the test targets the nodes themselves, and a test is not converted on the entire network including the network transmission paths.

Accordingly, with the conventional test method, there have been the following problems.

(1) As described above, in a conventional computer network test, each network connecting device (such as a node) serves as a testing device to transmit and receive data, thereby confirming normality of the network. Accordingly, only the connecting devices are tested, and a total network test on the entire network including the transmission paths is not properly carried out.

(2) As the LANs are widely used, there are many different types of networks to be tested. To test these networks and ensure normality, a conventional connector loopback test, such as a physical-layer loopback or node loopback, is not adequate.

(3) In the conventional computer network test, the test itself is carried out through a program. However, the layer structure of the network is not taken into account in the conventional test. For instance, when normality is confirmed on the physical layer, the network control program is not activated, or which layer a communication error between applications comes from cannot be detected. To solve this problem, it is necessary to change the fundamentals of the network test.

Therefore, the objects of the present invention are to solve the above problems in the prior art, and to enable a computer to perform a test on each layer in a network by a special-purpose testing device, so that the connection of the network and nodes are entirely secured.

DISCLOSURE THE INVENTION

To achieve the above objects of the present invention, the present invention provides a method of testing a network for normality with a testing device in which a testing program is installed. This testing program includes two independent programs, a transmission program and a reception program, and a loopback test is performed between the transmission program and the reception program, thereby confirming normality of the network.

In the above method, the transmission program and the reception program each have a testing interface in each of a logical link control layer, a network layer, a transport layer, and an application layer, and transmission and reception of test data during the loopback test are performed through the testing interfaces.

The transmission program transmits test data from the application layer, the transport layer, and the network layer, while the reception program receives the test data on the application layer, the transport layer, and the network layer, thereby determining normality of the application layer, the transport layer, and the network layer of the network.

In accordance with the present invention, when testing a network for normality by a testing device in which a testing program is installed, a loopback test is performed between a transmission program and a reception program, which are independent of each other. Based on the result of the loopback test, normality of the network is determined.

In this manner, a test on each layer of the network can be performed by the special-purpose device. Thus, stable connection between the network and nodes can be ensured.

In accordance with the present invention, the transmission program and the reception program transmit and receive test data through the respective interfaces of the logical link control layer, the network layer, the transport layer, and the application layer.

In this manner, a test can be performed on each layer of the network by the special-purpose device, and connection between the network and nodes can be ensured. Also, the cause of a network error and which layer the network error comes from can be detected. Thus, a setting error that cannot be detected in each layer through a conventional program can be easily solved.

BRIEF DESCRIPTION OF THE DRAWINGS

FIG. 13 shows the structures of protocol type data in the data used in the testing program;

FIG. 14 shows the structure of command data in the data used in the testing program;

FIG. 15 shows the structure of return code data in the data used in the testing program;

PREFERRED EMBODIMENTS FOR CARRYING OUT THE INVENTION

Figure 1:
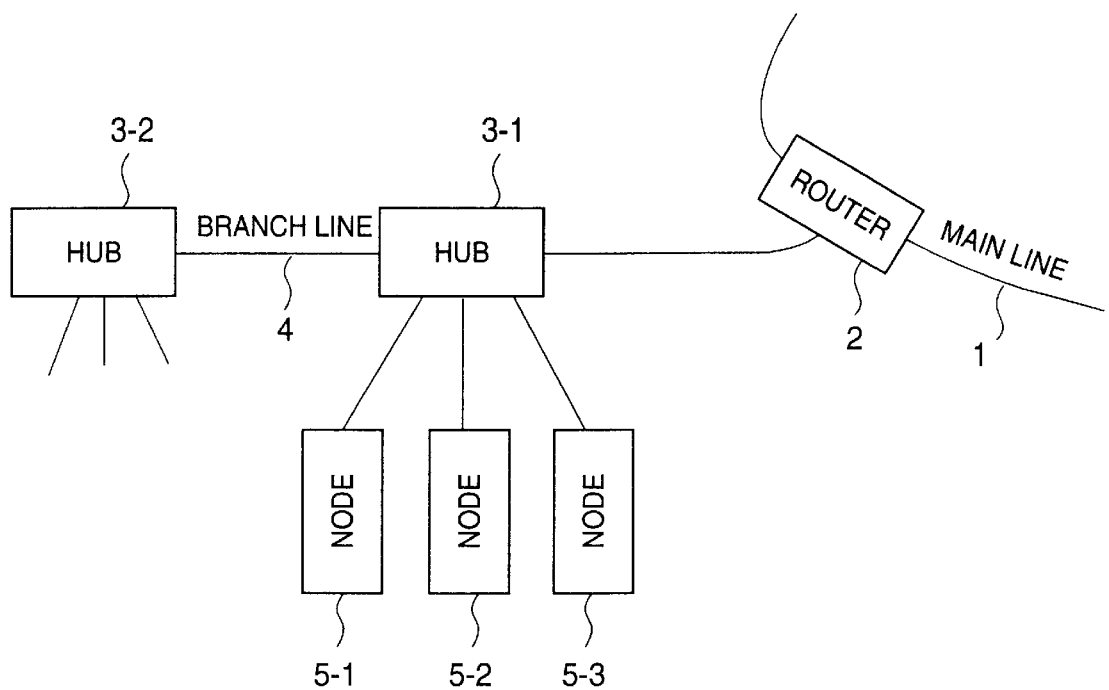
FIG. 1 is a schematic view of a conventional network system.
Figure 2:
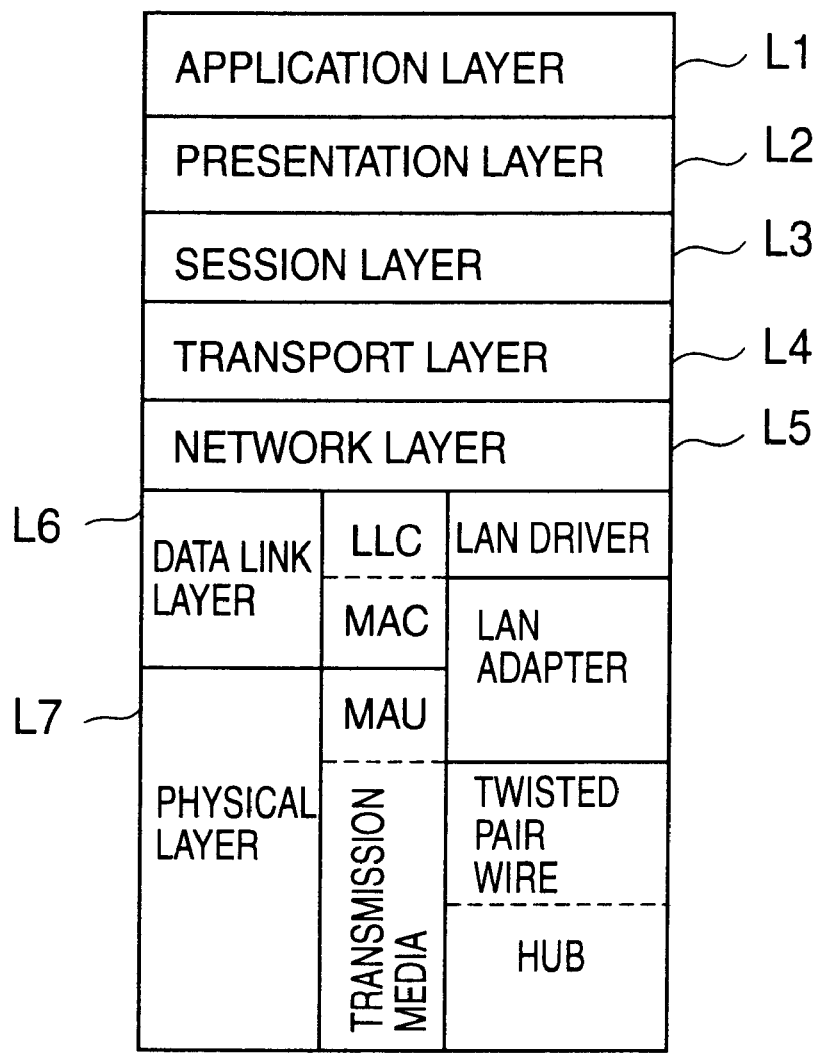
FIG. 2 shows the 7-layer model for OSI.

The following is a description of embodiments of the present invention, with reference to the accompanying drawings. The system used in the embodiments of the present invention is the same as the conventional system shown in FIG. 1. In the following description, test data will be referred to simply as a "packet".

The outline of the network test method is as follows. In this test, a testing program (a special-purpose testing device) for a network test is employed, and test data (packet) is transferred through each of the datalink layer, the network layer, the transport layer, and the session layer in the OSI reference model, thereby testing the network for normality. This test is carried out between the following devices.

A first test method is a loopback test between a testing device (testing program) and an MAU (media attachment unit). This test will be hereinafter referred to as "testing device (testing program) and MAU loopback test".

A second test method is a loopback test between a testing device (testing program) and a designated node. This test will be hereinafter referred to as "testing device (testing program) and designated node loopback test".

A third test method is a loopback test between testing devices (testing programs). This program will be hereinafter referred to as "testing devices (testing programs) loopback test".

In the above tests, the pattern of the test data (packet), the data format, and the testing programs (test protocols) are all specially prepared. In this description of the embodiments, the two terms, "testing program" and "test protocol", are synonymously used. The testing program has functions as follows.

A reception program (reception protocol) and a transmission program (transmission protocol) exist independently of each other.

In response to a connection request from the transmission program, the reception program returns a "test allowed" message or "test not allowed (or connection rejected)" message.

Upon receipt of a "loopback echo" command or a "designated pattern continue response" command, the reception program transmits a response.

In response to a connection release request from the transmission program, the reception program returns a "release completed" response or a "forcibly release completed (or test data return interruption)" response.

The transmission program and the reception program each have a test interface for each of the logical link control (LLC) layer, the network layer, the transport layer, and the application layer. The test data transmission and reception during the loopback test are carried out through the test interfaces.

The reception program is in a stand-by state in the initial stage, and is activated upon receipt of a connection request from the transmission program. The testing program possesses commands for connection, disconnection, loopback, and special pattern responses.

Next, embodiments utilizing the test method of the present invention will be described.

First, the "testing device (testing program) and MAU loopback test" will be explained. In this embodiment, the test is carried out in the node of an object to be tested.

Figure 3:
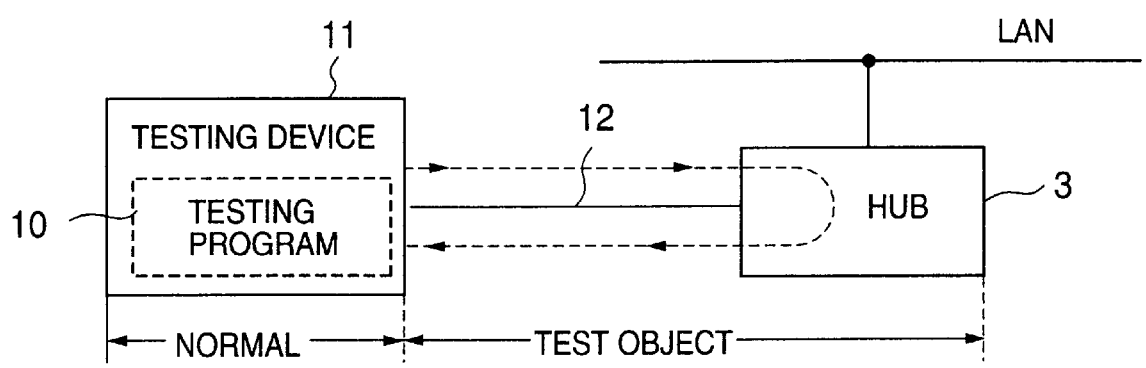
FIG. 3 is a schematic diagram of a system of a first embodiment of the present invention.
Figure 4:
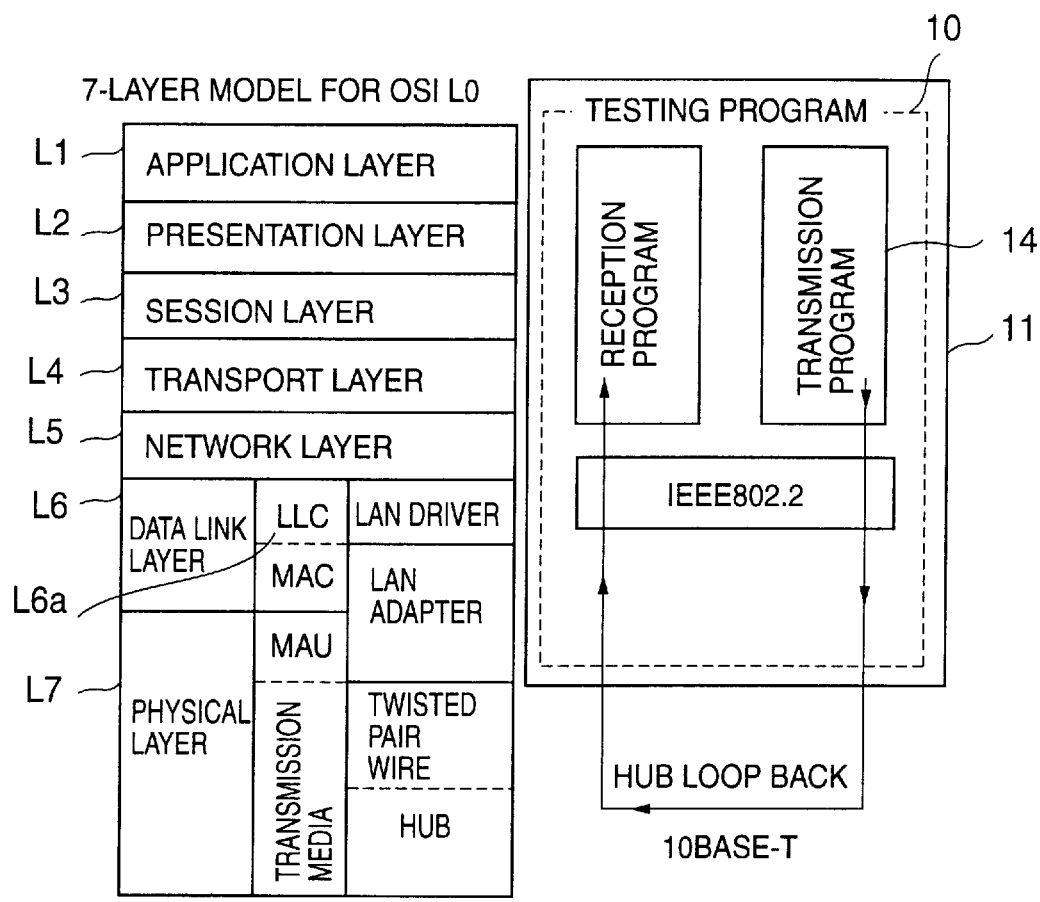
FIG. 4 shows the relationship between a testing program of the first embodiment and the 7-layer model for OSI.

FIG. 3 is a schematic diagram of a system of a first embodiment of the present invention. FIG. 4 shows the relationship between the testing program of the first embodiment and the 7-layer model for OSI.

In this embodiment, test data (a test packet) is looped back in a hub 3 which is provided in the 10 BASE-T standard. A testing device 11 has both a reception program 15 and a transmission program 14. A testing program 10 containing the reception program 15 and the transmission program 14 directly drives an I/O control driver of the LLC layer.

The "10BASE-T" specifies a base band having a data transmission rate of 10 Mbps, and using a twisted pair wire. This is substantially equivalent to a normal star LAN at 10 Mbps. The transmission program 14 and the reception program 15 each perform protocol control to transmit or receive test data (packets). The test is actually performed as follows.

As shown in FIG. 3, the testing device 11 is connected to the hub 3, which is connected to a LAN, via a twisted pair wire 12 (a cable provided in the 10 BASE-T). A loopback test is performed between the testing device 11 and the hub 3.

The testing device 11 has the testing program 10 that includes the transmission program 14 and the reception program 15, and the loopback test starts when an operator activates the testing program 10. The testing device 11 is normally represented by a personal computer (a notebook computer, for instance) or a workstation. Prior to the test, the validity of the testing device 11 needs to be confirmed.

As an operator activates the testing program 10 of the testing device 11, the test starts. As shown in FIG. 4, the transmission program 14 first transmits a packet provided in the IEEE 802.2. This packet is looped back at the hub 3, and the reception 15 then receives the packet. The transmission and reception of the packet are carried out at the network layer L5, when the LAN driver of an LLC layer L6a in the data link layer L6 is directly driven.

After the transmission and reception of the test data, the testing program 10 compares the packet transmitted by the transmission program 14 with the packet received by the reception program 15 so as to judge the normality of the tested object. Based on the judgement result, the normality of the tested object is confirmed.

Next, a second embodiment of the present invention will be described.

Figure 5:
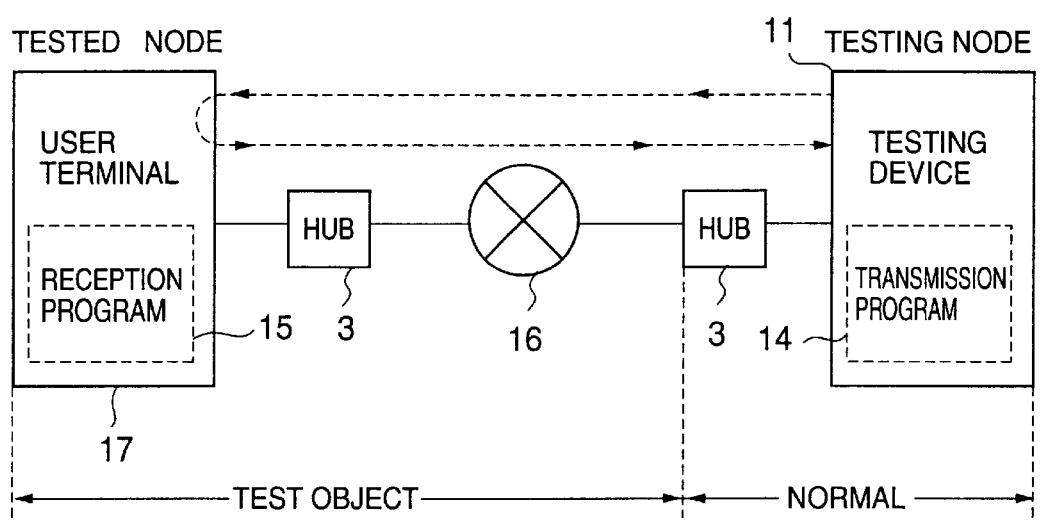
FIG. 5 is a schematic diagram of a system of a second embodiment of the present invention.
Figure 6:
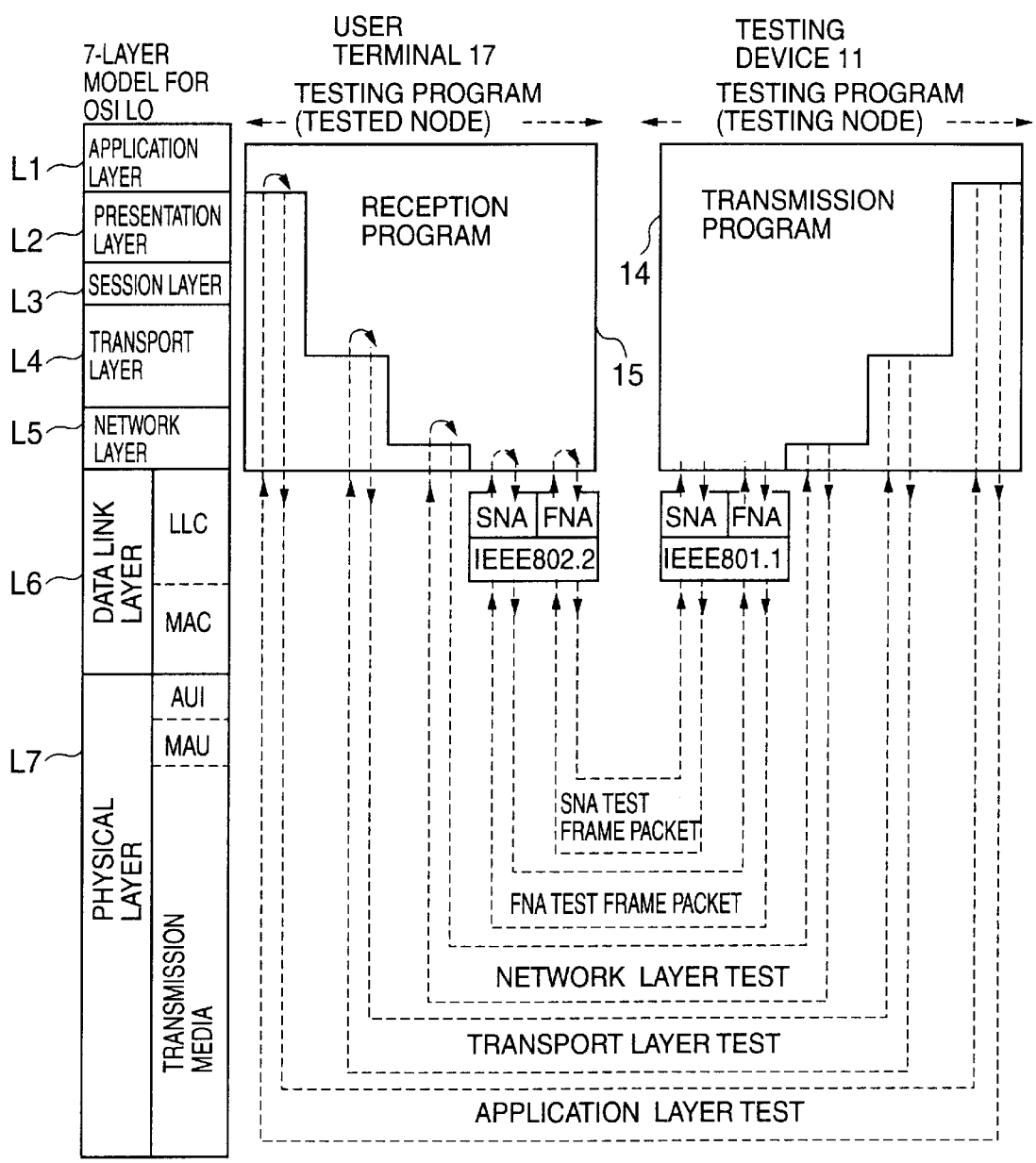
FIG. 6 shows the relationship between a testing program of the second embodiment and the 7-layer model for OSI.

FIG. 5 is a schematic diagram of a system of the second embodiment of the present invention. FIG. 6 shows the relationship between a testing program of the second embodiment and the 7-layer model for OSI.

This embodiment is an example of the "testing device (testing program)—designated node loopback test".

As shown in FIG. 5, in a test of this embodiment, the testing device 11 is used as a testing node, and a user terminal 17 (a personal computer, for instance) is used as a node to be tested. The testing device 11 and the user terminal 17 are connected to a network 16 via the hubs 3. Here, the testing device 11 is provided with the transmission program 14, while the user terminal 17 is provided with the reception program 15.

Where the condition between the testing device 11 and the hub 3 on the side of the testing device 11 is normal (i.e., where the normality is confirmed through the test of the first embodiment), a test is carried out for the range from the hub 3 on the side of the testing device 11 to the user terminal 17 (i.e., the range including the network 16, the hub 3, and the user terminal 17). In this test, the normality of the node is checked.

There are two types of test in this embodiment: one is a loop test in which the node to be tested receives test data from the testing node, and returns the test data to the testing node; and the other is a catch test in which the testing node notifies the node to be tested of a data format, and the node to be tested transmits the test data in the data format to the testing node. The loop test will be described below in greater detail.

In the loop test, the transmission program 14 of the testing device 11 (the testing node) transmits the test data to the user terminal 17 via the network 16. The test data is looped back by the reception program 15 of the user terminal 17, and is returned to the testing device 11. This returned packet is received by the testing device 11, which then compares this received packet with the packet transmitted to the user terminal 17, so as to judge the normality of the tested object.

The relationship between the testing program in this loop test and the 7-layer model for OSI L0 is shown in FIG. 6. In this loop test, the testing program (the test protocol) is on the application layer L1, the transport layer L4, and the network layer L5. The SNA (Systems Network Architecture) used in this test is a network system developed by IBM Corp., and the FNA (Fujitsu Network Architecture) is a network system developed by Fujitsu Limited.

As the test starts, the transmission program 14 of the testing device 11 transmits a packet (test data) from the application layer L1 to the user terminal 17 via the transmission media of the physical layer L7. Upon receipt of this packet, the reception program 15 of the user terminal 17 loops back the packet on the application layer L1, and returns the packet to the testing device 11. The testing device 11 then receives the returned packet, and compares the returned packet with the packet transmitted to the user terminal 17, thereby testing the application layer L1.

The transmission program 14 of the testing device 11 next transmits a packet from the transport layer L4 to the user terminal 17 via the transmission media of the physical layer L7. Upon receipt of this packet, the reception program 15 of the user terminal 17 loops back the packet on the transport layer L4, and again returns the packet to the testing device 11. The testing device 11 receives the returned packet, and compares the returned packet with the packet transmitted to the user terminal 17, thereby testing the transport layer L4.

The transmission program 14 of the testing device 11 transmits a packet from the network layer L5 to the user terminal 17 via the transmission media of the physical layer L7. Upon receipt of this packet, the reception program 15 of the user terminal 17 loops back the packet on the network layer L5, and again returns the packet to the testing device 11. The testing device 11 then receives the returned packet, and compares the returned packet with the packet transmitted to the user terminal 17, thereby testing the network layer L5.

Next, the transmission program 14 of the testing device 11 transmits an FNA test frame packet (test data) provided in the IEEE 802.2 based on the FNA. This FNA test frame packet is sent to the user terminal 17 via the transmission media of the physical layer L7. Upon receipt of the FNA test frame packet, the reception program 15 of the user terminal 17 loops back the FNA test frame packet on the network layer L5, and returns the FNA test frame packet to the testing device 11. The testing device 11 receives the returned packet, and compares the returned packet with the FNA test frame packet transmitted to the user terminal 17, thereby testing the network layer L5.

Next, the transmission program 14 of the testing device 11 transmits an SNA test frame packet, which is provided in the IEEE802.2, based on the SNA. This SNA test frame packet is sent to the user terminal 17 via the transmission media of the physical layer L7. Upon receipt of the SNA test frame packet, the reception program 15 of the user terminal 17 loops back the received packet on the network layer L5, and again returns the packet to the testing device 11. The testing device 11 receives the returned packet, and compares the returned packet with the SNA test frame packet transmitted to the user terminal 17, thereby testing the network layer L5.

Figure 7:
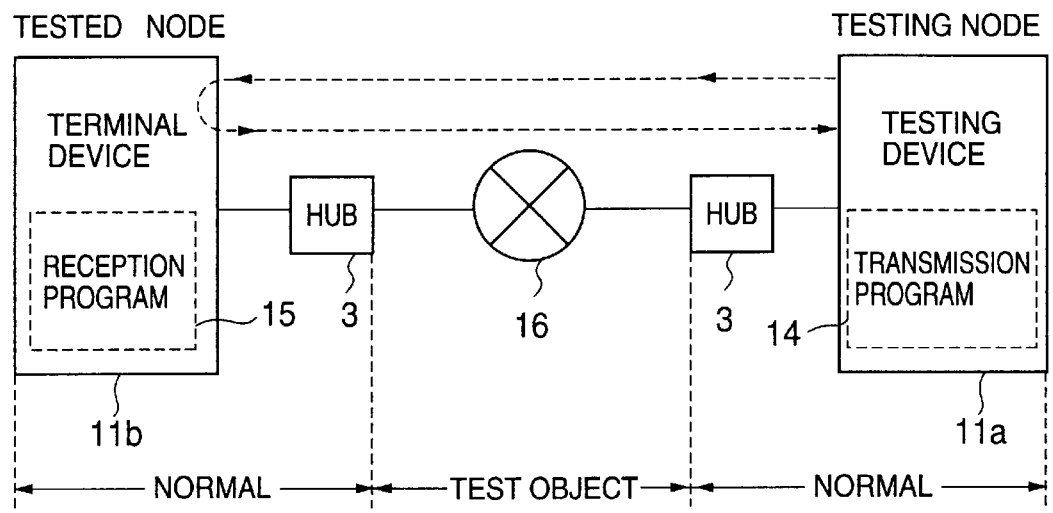
FIG. 7 is a schematic diagram of a system of a third embodiment of the present invention.
Figure 8:
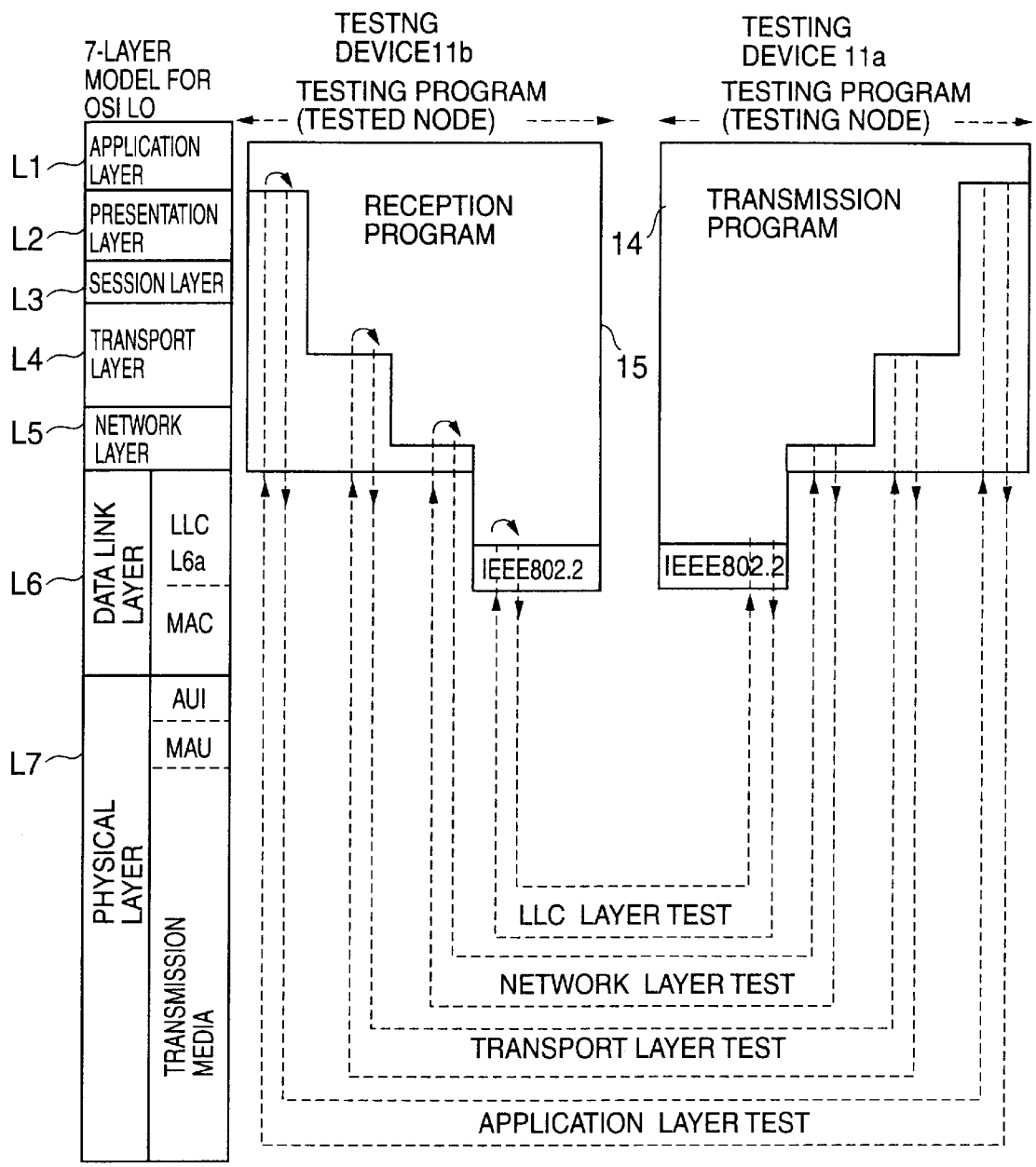
FIG. 8 shows the relationship between a testing program of the third embodiment and the 7-layer model for OSI.

Referring now to FIGS. 7 and 8, a third embodiment of the present invention will be described below.

FIG. 7 is a schematic diagram of a system of the third embodiment of the present invention, and FIG. 8 shows the relationship between a testing program of the third embodiment of the present invention and the 7-layer model for OSI.

In this embodiment, the "testing device (testing program)—testing device (testing program) loopback test" is performed.

As shown in FIG. 7, the test of this embodiment entails a testing device 11a on the transmission side and a testing device 11b on the reception side. The testing device 11a and the testing device 11b are connected to the network 16 via the hubs 3. The testing device 11a on the transmission side is provided with the transmission program 14, while the testing device 11b on the reception side is provided with the reception program 15.

Where the condition between the testing device 11a and one of the hubs 3 and the condition between the testing device 11b and the other hub 3 are normal (i.e., where the normality is confirmed through the test of the first embodiment), a test is carried out for the range between the two hubs 3 (i.e., the range including the network 16 as shown in FIG. 7). In this test, the normality of the test object is checked.

In this test, the transmission program 14 of the testing device 11a on the transmission side transmits a packet to the testing device 11b on the reception side via the network 16. The reception program 15 of the testing device 11b on the reception side loops back the packet, and returns the packet to the testing device 11a on the transmission side. The testing device 11a receives the returned packet, and then compares the returned packet with the packet transmitted to the testing device 11b on the reception side, thereby checking the test object for normality.

The relationship between the testing program of this embodiment and the 7-layer model for OSI L0 is shown in FIG. 8. As shown in FIG. 8, the test protocol (the testing program) is activated on the LLC layer L6a, as well as on the application layer L1, the transport layer L4, and the network layer L5. A loop test is again performed in this embodiment, but this embodiment can also be applied to a catch test.

As the test starts, the transmission program 14 of the testing device 11a on the transmission side transmits a packet from the application layer L1 to the testing device 11b on the reception side via the transmission media of the physical layer L7. Upon receipt of this packet, the reception program 15 of the testing device 11b on the reception side loops back the packet on the application layer L1, and returns the packet to the testing device 11a on the transmission side. The testing device 11a on the transmission side receives the returned packet, and then compares the returned packet with the packet transmitted to the testing device 11b on the reception side, thereby testing the application layer L1.

The transmission program 14 of the testing device 11a on the transmission side next transmits a packet from the transport layer L4 to the testing device 11b on the reception side via the transmission media of the physical layer L7. Upon receipt of this packet, the transmission program 15 of the testing device 11b on the reception side loops back the packet on the transport layer L4, and returns the packet again to the testing device 11a on the transmission side. The testing device 11a on the transmission side receives the returned packet, and then compares the returned packet with the packet transmitted to the testing device 11b on the reception side, thereby testing the transport layer L4.

Next, the transmission program 14 of the testing device 11a on the transmission side transmits a packet from the network layer L5 to the testing device 11b on the reception side via the transmission media of the physical layer L7. Upon receipt of this packet, the reception program 15 of the testing device 11b on the reception side loops back the packet, and returns the packet again to the testing device 11a on the transmission side. The testing device 11a on the transmission side receives the returned packet, and then compares the returned packet with the packet transmitted to the testing device 11b on the reception packet, thereby testing the network layer L5.

The transmission program 14 of the testing device 11a on the transmission side next transmits a packet, which is provided in the IEEE802.2, from the LLC layer L6a of the datalink layer L6 to the testing device 11b on the reception side via the transmission media of the physical layer L7. Upon receipt of this packet, the reception program 15 of the testing device 11b on the reception side loops back the packet on the LLC layer L6a of the datalink layer L6, and returns the packet again to the testing device 11a on the transmission side. The testing device 11a on the transmission side receives the returned packet, and then compares the returned packet with the packet transmitted to the testing device 11b on the reception side, thereby testing the LLC layer L6a.

Figure 9:
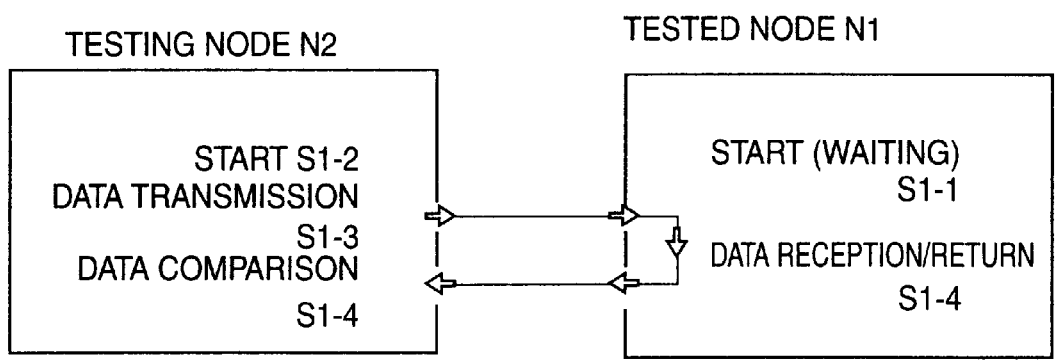
FIG. 9 illustrates an operation of a loop test.

Referring now to FIG. 9, the testing program of the second and third embodiments will be described below.

FIG. 9 shows the procedures of the loop test in the second and third embodiments.

First, an operator manually starts a node N1 to be tested, and puts the node N1 in a waiting state (step S1-1).

The operator then manually starts a testing node N2 (step S1-2).

The testing node N2 transmits test data (a packet) to the tested node N1 (step S1-3).

The tested node N1 receives the test data and returns the test data to the testing node N2 (step S1-4).

The testing node N2 compares the transmitted test data with the returned test data, so as to confirm the normality of the data transmission (step S1-5). Steps S1-1 to S1-5 are then repeated.

Although the loop test is performed in the second and third embodiments, a catch test can also be performed.

Figure 10:
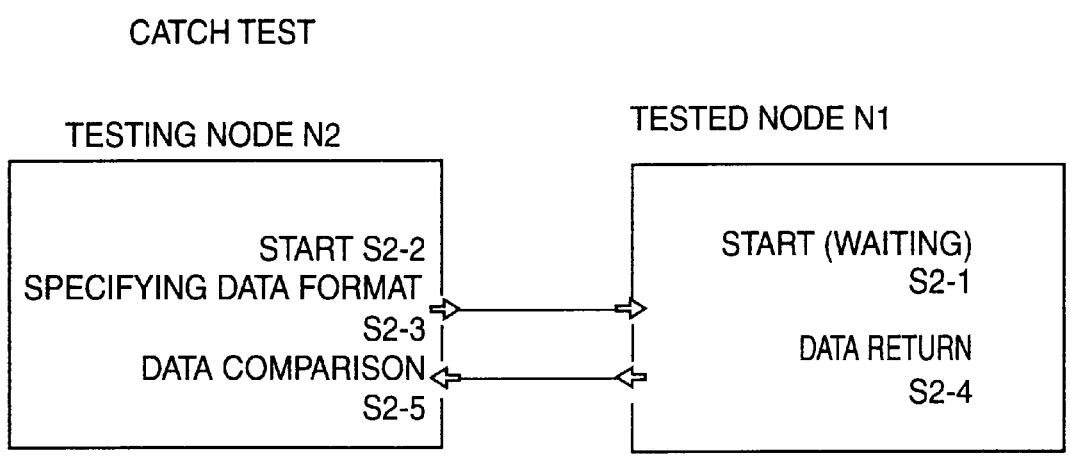
FIG. 10 illustrates an operation of a catch test.

FIG. 10 shows an operation of a catch test in accordance with the present invention.

First, an operator manually starts the node N1 to be tested, and puts the node N1 in a waiting state (step S2-1).

The operator then starts the testing node N2 (step S2-2).

The testing node N2 notifies the tested node N1 of the data format of test data to be transmitted (step S2-3).

The tested node N1 receives the notification, and returns the test data of the designated format to the testing node N2 (step S2-4).

The testing node N2 determines whether or not the returned test data is in the designated data format (step S2-5). Steps S2-1 to S2-5 are then repeated.

The data structures used in the testing program in accordance with the present invention will now be described below.

Figure 11:
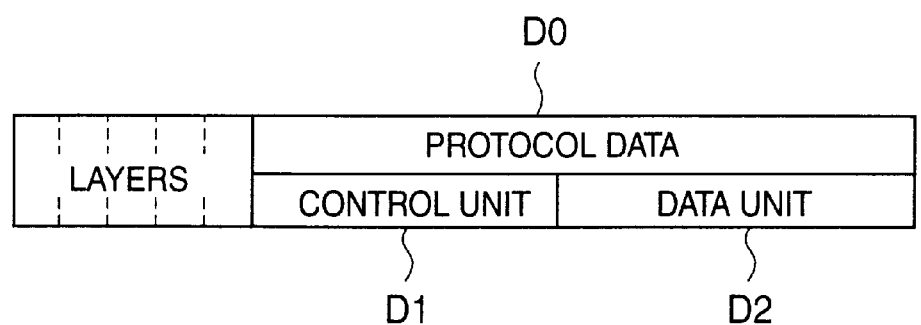
FIG. 11 shows the entire structure of data used in a testing program.
Figure 12:
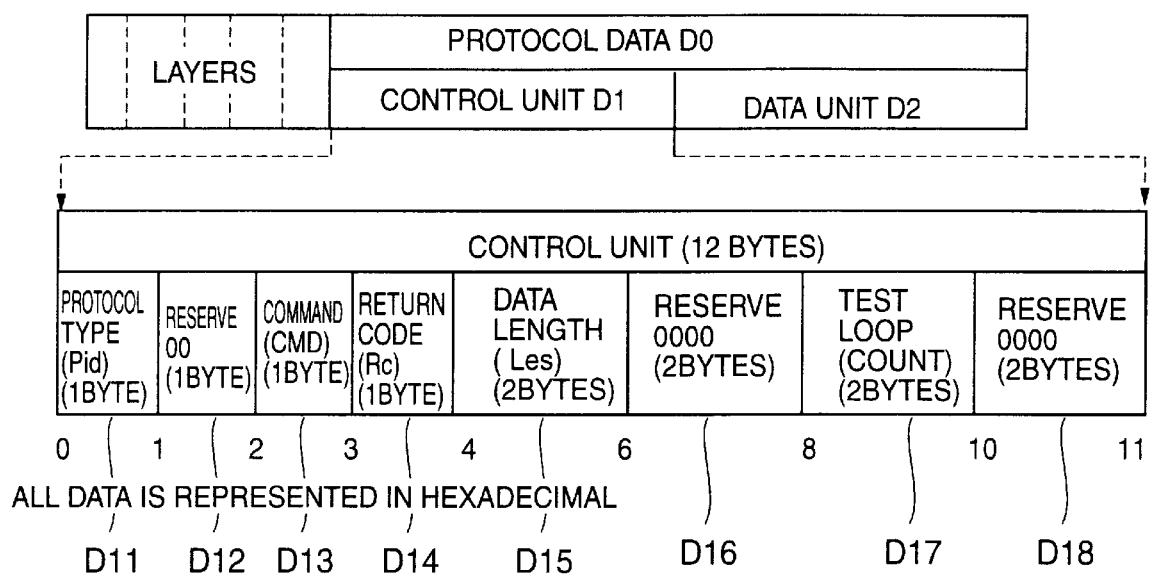
FIG. 12 shows the structure of control data in the data used in the testing program.
Figure 16:
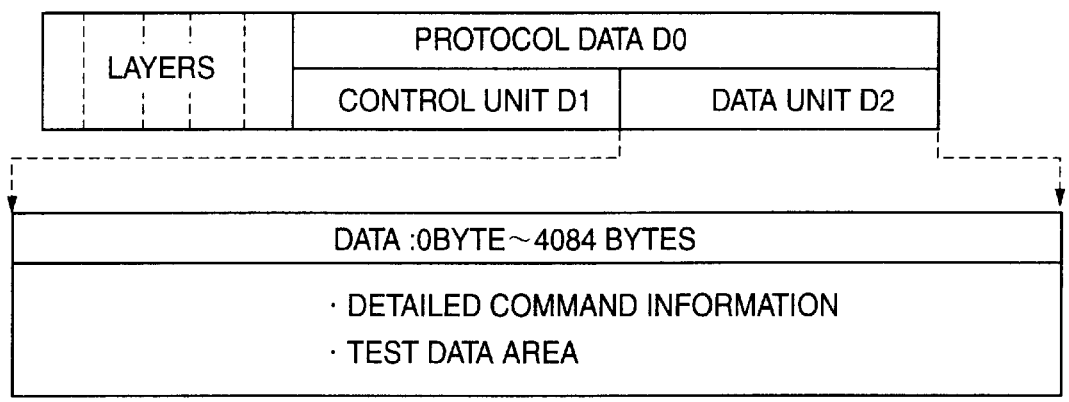
FIG. 16 shows the structure of a data area in the data used in the testing program.

FIG. 11 shows the entire structure of data used in the testing program in accordance with the present invention. FIG. 12 shows the data structure of a control part of the data used in the testing program. FIG. 13 shows the data structure of a protocol type part of the data used in the testing program. FIG. 14 shows the data structure of a command part of the data used in the testing program. FIG. 15 shows the data structure of a return code part of the data used in the testing program. FIG. 16 shows the data structure of a data unit of the data used in the testing program.

As shown in FIG. 11, the test data D0 (also referred to as "protocol data" in this specification) used in each layer of the network comprises a control unit D1 and the data unit D2. The control unit D1 holds control information such as protocol types and commands. The data unit D2 holds test data or additional information for the control unit.

The control unit D1 and the data unit D2 will be described below in greater detail.

As shown in FIG. 12, the control unit D1 in the protocol data D0 defines information necessary for performing the test. For instance, the control unit D1 consists of 12-byte data, and defines information including a 1-byte protocol type (Pid) D11, a 1-byte command (CMD) D12, a 1-byte return code (RC) D13, a 2-type data length (Leg) D15, and a 2-byte test loop count (Count) D17. It should be noted that all the data shown in FIG. 12 are hexadecimal.

The protocol type (Pid) D11 includes codes C0 and C1. The code C0 is a request code, and the code C1 is a response code.

As shown in FIG. 14, the command (CMD) D13 is a command PROLOG (code 01), a command EPILOG (code 02), a command LOOP (code 03), a command MESSAGE (code 04), or a command CATCH (code 05).

The command PROLOG (code 01) is a command for starting data transmission. In compliance with this command, the protocol version and system information are exchanged to confirm the connection.

The command EPILOG (code 02) is a command for ending data transmission. The command LOOP (code 03) is a command to instruct the testing node to loop back the test data, and to instruct the tested node to return the test data to the testing node.

The command MESSAGE (code 04) is a command to instruct the tested node to display a message, and can be transmitted anytime during the sequence between the command PROLOG and the command EPILOG.

The command CATCH (code 05) is a command to notify the testing node of a data format, and to instruct the tested node to return the test data.

The return code (RC) D14 is 1-byte data. As shown in FIG. 15, the state of the tested node is sent as the return code RC to the testing node. The testing node examines the return code RC, and performs the following processes. The return code RC might be defined by a response to each command.

The return code RC is a normal return code (00) or an abnormal return code (01, 02, 03, 04, 05, 10, or 20). The abnormal return code indicates a protocol data error (01, 02, 03, 04, or 05), a sequence error (10), or a cancelled process (20).

The return code RC (00) is a code for indicating that a process specified by a command has successfully ended. The return code RC (01) is a code for indicating that there is an error in a protocol type code. The return code RC (02) is a code for indicating that there is an error in a command code. The return code RC (03) is a code for indicating that there is an error in a data length.

The return code RC (04) is a code for indicating that there is an error with code designation in the display data of a message request. The return code RC (05) is a code for indicating that there is no function corresponding to the protocol version specified by a protocol request.

The return code RC (10) is a code for indicating that there is a sequence error in a received request command. The sequence error means a case where a command for starting a test is not the command PROLOG, or a case where the command PROLOG is issued twice, for instance. The return code RC (20) is a code for indicating that a test is interrupted or forcibly interrupted due to an incident in the operation of the tested node.

The data length (Leg) D15 indicates the length of the data unit D2, and is made up of 2 bytes.

The test loop count (Count) D17 indicates the number of times the master is carried out. The initial value of the test loop count D17 is X000. The test loop count D17 is used only for a request for or a response to the command LOOP, and is not used for a request for or a response to any other command.

Next, the data unit D2 will be described in greater detail.

As shown in FIG. 16, the data unit D2 is made up of 0-byte to 4084-byte data. The data unit D2 is made up of a detailed command information area and a test data area, which are determined by the contents of the control unit D1.

Figure 17:
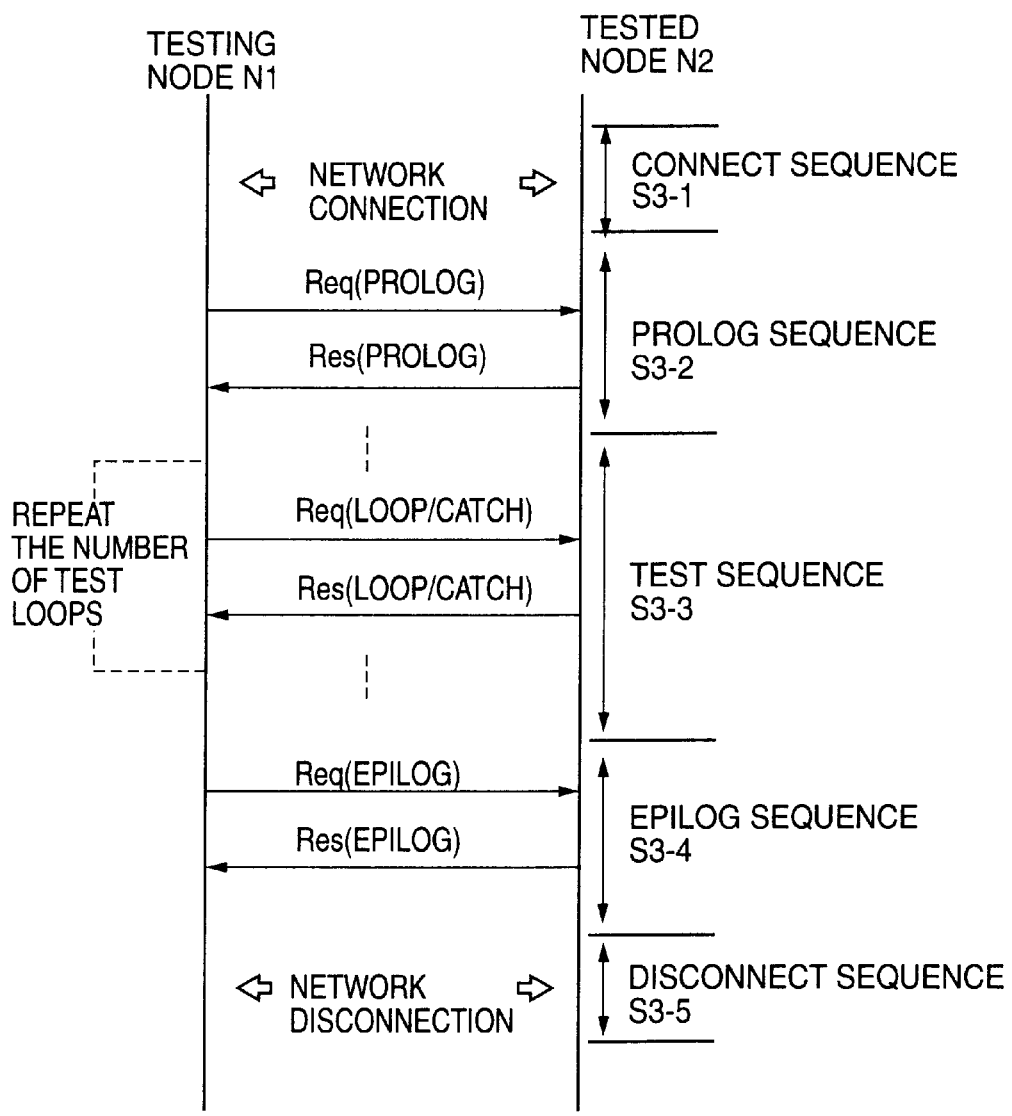
FIG. 17 is a sequence diagram of a test using the data shown in FIGS. 11 to 16.

FIG. 17 is a sequence diagram of a test that is carried out using the data shown in FIGS. 11 to 16.

As shown in FIG. 17, in a CONNECT step, the testing node N1 and the node N2 to be tested are connected via a network (step S3-1). In this protocol, network connection and disconnection are not specified.

In a PROLOG step, a request (PROLOG) is sent from the testing node N1 to the node N2 to be tested. A response (PROLOG) to the request is returned from the tested node N2 to the testing node N1 (step S3-2).

A request (LOOP/CATCH) is then sent from the testing node N1 to the tested node N2, and s response (LOOP/CATCH) is returned from the tested node N2 to the testing node N1 (step S3-3). These steps are repeated the number of times equivalent to the number of test loops.

In an EPILOG step, a request (EPILOG) is sent from the testing node N1 to the tested node N2, and a response (EPILOG) to the request is returned from the tested node N2 to the testing node N1 (step S3-4). Finally, in a DISCONNECT step, the test node N1 and the tested node N2 are disconnected via the network (step S3-5).

Figure 18:
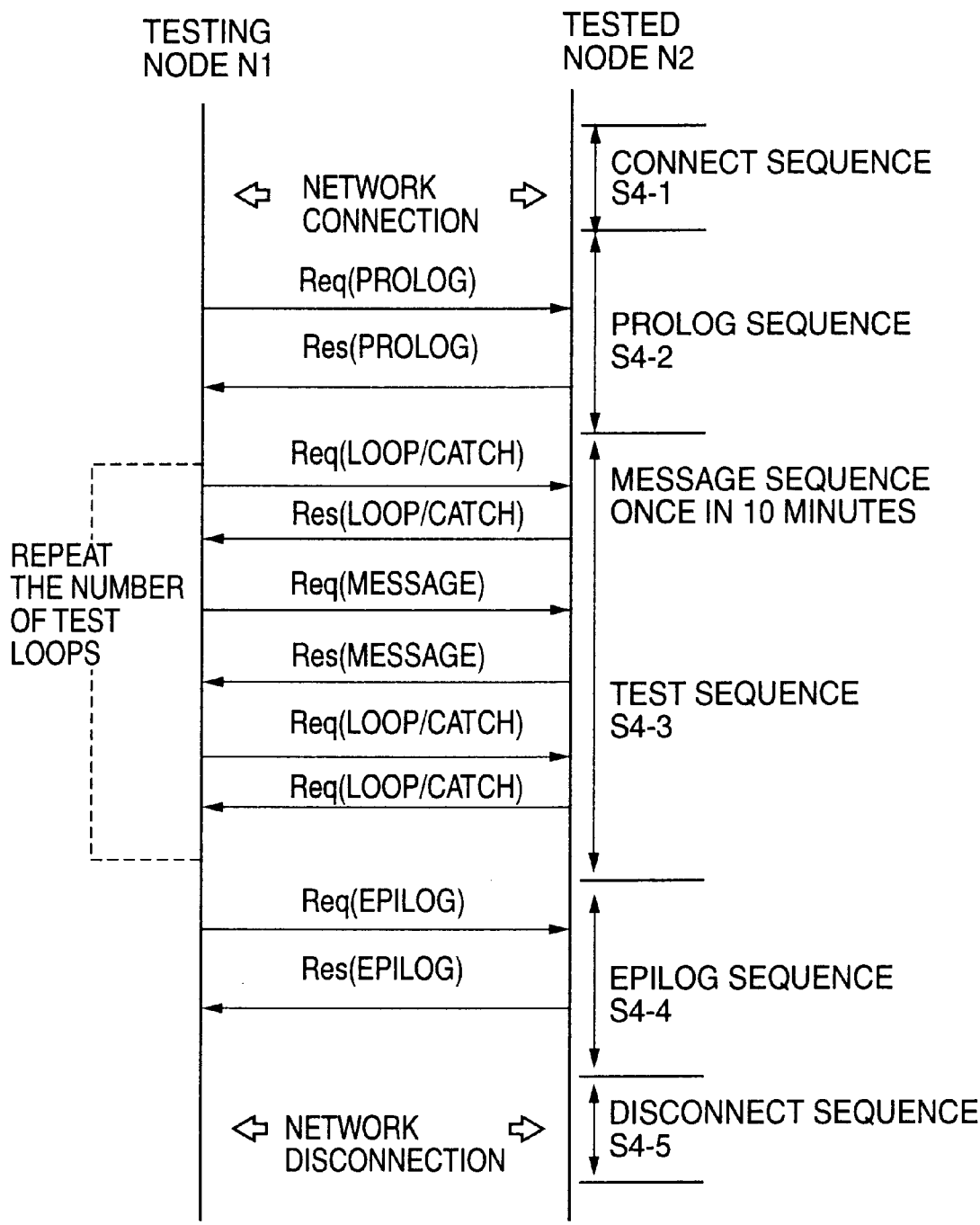
FIG. 18 is a sequence diagram of a modified test of the sequence of FIG. 17.

FIG. 18 shows a sequence diagram of a modification of the test sequence shown in FIG. 17.

In this modified example, a MESSAGE step is added to the sequence of FIG. 17.

First, in a CONNECT step, the testing node N1 and the node N2 to be tested are connected via a network (step S4-1). In this protocol, network connection and disconnection are not specified.

In s PROLOG step, a request (PROLOG) is sent from the testing node N1 to the node N2 to be tested, and a response (PROLOG) to the request is returned from the tested node N2 to the testing node N1 (step S4-2).

In a test step, a request (LOOP/CATCH) is sent from the testing node N1 to the node N2 to be tested, and a response (LOOP/CATCH) to the request is returned from the tested node N2 to the testing node N1. Also, a request (MESSAGE) is sent from the testing node N1 to the node N" to be tested, and a response (MESSAGE) to the request is returned from the tested node N2 to the testing node N1.

Further, a request (LOOP/CATCH) is sent from the testing node N1 to the node N2 to be tested, and a response (LOOP/CATCH) to the request is returned from the tested node N2 to the testing node N1 (step S4-3). These steps are repeated the number of times equivalent to the number of test loops, but only the MESSAGE step is performed once in 10 minutes.

After the above test sequence, in an EPILOG step, a request (EPILOG) is sent from the testing node N1 to the node N2 to be tested, and a response (EPILOG) to the request is returned from the tested node N2 to the testing node N1 (step S4-4). At last, in a DISCONNECT step, the testing node N1 and the tested node N2 are disconnected via the network (step S4-5).

Next, an operation at a time of error occurrence will be described.

Figure 19:
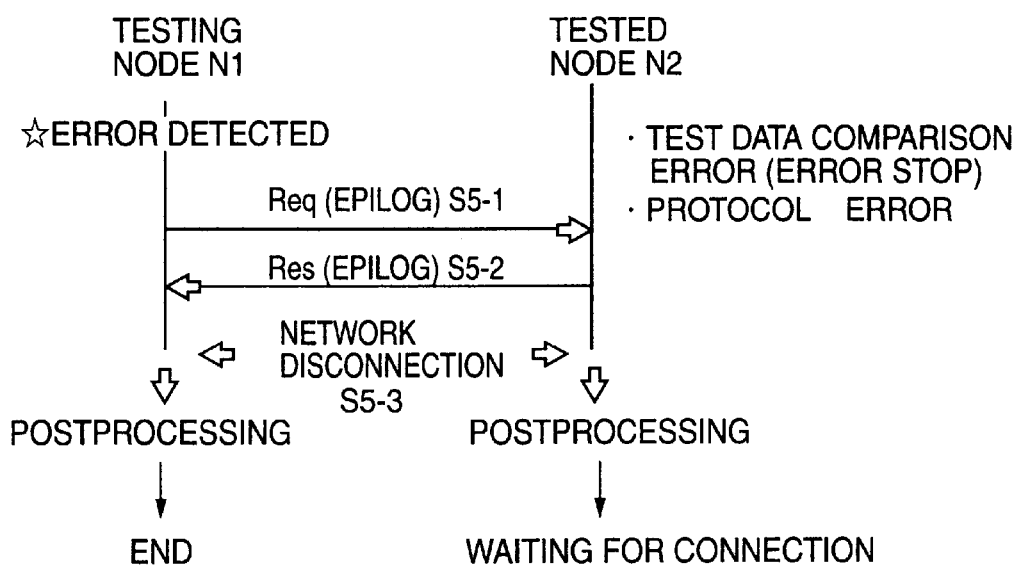
FIG. 19 is a sequence diagram of an operation when an error is detected in a testing node.

FIG. 19 is a sequence diagram of an operation when an error is detected in the testing node N1.

When an error is detected in the testing node N1, the testing node N1 sends an EPILOG request to the node N2 to be tested (step S5-1). Here, the code in the data unit D2 of the EPILOG request is sent as X'00FF'.

Upon receipt of the EPILOG request, the tested node N2 transmits an EPILOG response to the testing node N1 (step S5-2).

The testing node N1 and the tested node N2 are then disconnected via the network (step S5-3).

Figure 20:
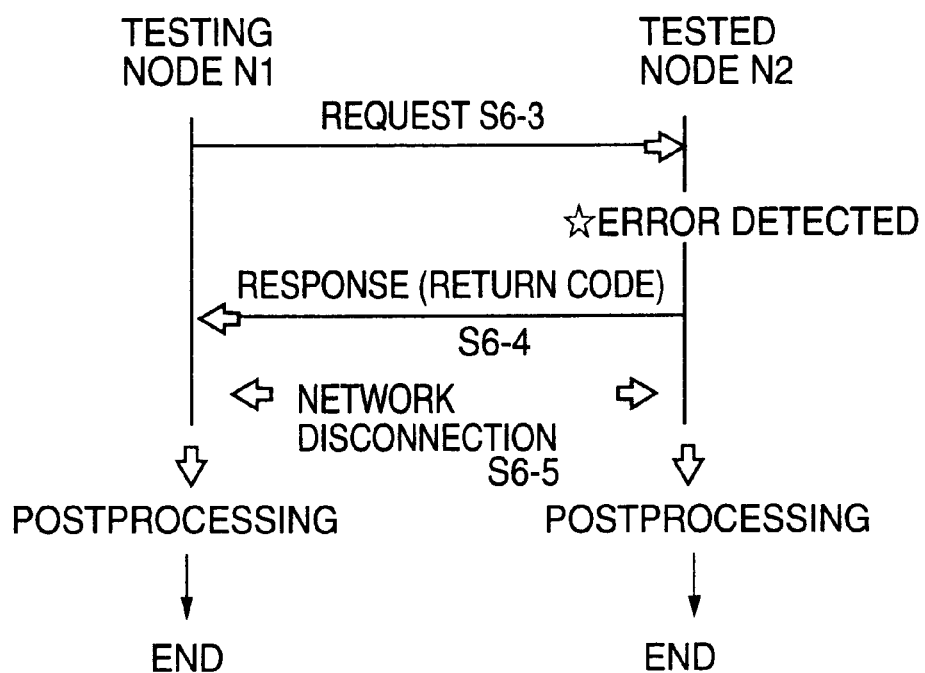
FIG. 20 is a sequence diagram of an operation when an error is detected in a tested node.

FIG. 20 is a sequence diagram of an operation when an error is detected in the tested node N2.

When an error is detected in the tested node N2, the tested node N2 transmits a response (a return code RC) to the testing node N1 (step S6-4).

The return code RC corresponding to the cause of the error detected in the tested node N2 is stored in the return code area D14 in the control unit D1 of the response protocol data D0, as shown in FIG. 12. The return code RC is then sent to the testing node N1. Here, the meaning of the return code is determined by the response corresponding to the command received by the tested node. The testing node N1 and the tested node N2 are then disconnected via the network (step S6-5).

As described above, the network is tested for normality by the testing device in which the testing program is installed. The testing program has to independent programs, the transmission program and the reception program. The loopback test is performed between the transmission program and the reception program, thereby confirming the network for normality.

The testing device 11 or the user terminal 17 is provided with a hard disk device, and the testing program is stored in the recording medium (hard disk) of the hard disk device. When performing the test, the testing program stored in the recording medium of the hard disk device is read out and stored in the memory in the testing device 11 or the user terminal 17 under the control of the CPU.

The CPU then reads out a necessary program among the programs stored in the memory, and executes the program so as to perform the test. A program is stored in the recording medium of the hard disk device in the following manner.

A program stored in a flexible disk (floppy disk) is read by a flexible disk drive provided in the testing device 11 or the user terminal 17, and is then stored in the recording medium (hard disk) of the hard disk device.

Data stored in the recording medium, such as an magneto-optical disk or a CD-ROM, is read by a drive unit provided in the testing device 11 or the user terminal 17, and is then stored in the recording medium (hard disk) of the hard disk device.

Data transmitted from another device via a communication line, such as a LAN, is received by the testing device 11 or the user terminal 17, and is then stored in the recording medium (hard disk) of the hard disk device.

As described above, the present invention has the following effects:

In a conventional computer network test, a total network test on the entire network including the transmission paths is not adequately carried out. In accordance with the present invention, on the other hand, a test can be performed on each layer of the network by a special-purpose device, thereby ensuring connection between the network and nodes.

To test a network and ensure normality, a conventional connector loopback test, such as a physical-layer loopback or node loopback, is not adequate. Also, the test itself is carried out through a program, and the layer structure of the network is not taken into account in the conventional test. For instance, when normality is confirmed on the physical layer, the network control program is not activated, or which layer a communication error between applications comes from cannot be detected. To solve this problem, it is necessary to change the fundamentals of the network test. In accordance with the present invention, on the other hand, a test can be performed on each layer of the network by a special-purpose device, thereby entirely ensuring the connection between the network and the nodes.

In accordance with the present invention, the cause of a network error and which layer the network error comes from can be detected. Thus, a setting error that cannot be detected in each layer through a conventional program can be easily solved.

When a network is tested for normality by a special-purpose device in which a testing program is installed, a loopback test is performed between a transmission program and a reception program, which are independent of each other. Based on a result of the loopback test, normality of the network is determined.

In this manner, a test on each layer of the network can be performed by the special-purpose device. Thus, stable connection between the network and nodes can be ensured.

Also, when performing the test, the transmission program and the reception program transmit and receive test data through the respective interface provided in the logical link layer, the network layer, the transport layer, and the application layer, thereby testing each layer of the network by the special-purpose device. Thus, the connection among the network and the nodes can be entirely ensured. Furthermore, the cause of a network error and which layer the network error comes from can be detected. Thus, a setting error that cannot be detected in each layer through a conventional program can be easily corrected.

Additionally, the CPU of a computer executes a program in the recording medium, so that a loopback test is performed between the transmission program and the reception program to confirm normality of the network. In this manner, a test can be performed on each layer of the network by the special-purpose device, and the connection among the network and the nodes can be totally ensured.

What is claimed is:

1. A method of testing a network for normality with a testing device in which a testing program is installed, said method comprising:

carrying out a loopback test between a transmission program and a reception program that independently exist in the testing program to check the network for normality, wherein said testing device comprises a device specially to test the network for normality and the transmission program and the reception program each have a testing interface in each of a logical link control layer, a network layer, a transport layer, and an application layer.

2. The method as claimed in claim 1, wherein:

test data transmission during the loopback test is performed through the testing interfaces.

3. The method as claimed in claim 2, wherein:

the transmission program transmits test data from the application layer; and the reception program receives the test data transmitted from the transmission program on the application program to confirm normality of the application layer of the network.

4. The method as claimed in claim 2, wherein:

the transmission program transmits test data from the transport layer; and the reception program receives the test data transmitted from the transmission program on the transport layer to confirm normality of the transport layer of the network.

5. The method as claimed in claim 2, wherein:

the transmission program transmits test data from the network layer; and the reception program receives the test data transmitted from the transmission program on the network layer to confirm normality of the network layer of the network.

6. The method as claimed in claim 1, wherein:

said device to specially test the network is connected to a device to be tested through the network so that the normality of the network is tested together with the device to be tested.

7. An apparatus that tests a network for normality by transmitting and receiving test data, said apparatus comprising:

a test data transmission unit that is provided in a transmission device connected to the network and transmits the test data;

a test data reception unit that is provided in a reception device connected to the network and receives the test data transmitted from the test data transmission device; and a determination unit that determines normality of the network based on the transmission and reception of the test data by the test data transmission unit and the test data reception unit, wherein at least one of said test data transmission unit and test data reception unit comprises a device to specially test the network for normality and the test data transmission unit and the test data reception unit each have a testing interface in each of a logical link control layer, a network layer, a transport layer, and an application layer of the transmission device and the reception device.

8. The apparatus as claimed in claim 7, wherein:

the test data transmission unit and the test data reception unit transmit and receive the test data through the testing interfaces.

9. The apparatus as claimed in claim 8, wherein:

the test data transmission unit transmits the test data from the application layer of the transmission device; and the test data reception unit receives the test data transmitted from the test data transmission unit on the application layer of the reception device to determine normality of the application layer of the network.

10. The apparatus as claimed in claim 8, wherein:

the test data transmission unit transmits the test data from the transport layer of the transmission device; and the test data reception unit receives the test data transmitted from the test data transmission unit on the transport layer of the reception device to determine normality of the transport layer of the network.

11. The apparatus as claimed in claim 8, wherein:

the test data transmission unit transmits the test data from the network layer of the transmission device; and the test data reception unit receives the test data transmitted from the test data transmission unit on the network layer of the reception device to determine normality of the network layer of the network.

12. The apparatus as claimed in claim 7, wherein:

said device to specially test the network is connected to a device to be tested through the network so that the normality of the network is tested together with the device to be tested.

13. A computer-readable recording medium that records a testing program comprising a transmission program and a reception program for enabling a computer to perform a loopback test between the transmission program and the reception program so as to determine normality of a network, wherein at least one of said transmission program and reception program is installed in a testing device to specially test the network for normality and the transmission program and the reception program each have a testing interface in each of a logical link control layer, a network layer, a transport layer, and an application layer.

14. The computer-readable recording medium as claimed in claim 13, wherein the transmission program and the reception program transmit and receive test data through the testing interfaces during the loopback test.

15. The computer-readable recording medium as claimed in claim 14, wherein:

the transmission program transmits the test data from the application layer; and the reception program receives the test data transmitted from the transmission program on the application layer to determine normality of the application layer of the network.

16. The computer-readable recording medium as claimed in claim 14, wherein:

the transmission program transmits the test data from the transport layer; and the reception program receives the test data transmitted from the transmission program on the transport layer to determine normality of the transport layer of the network.

17. The computer-readable recording medium as claimed in claim 14, wherein:

the transmission program transmits the test data from the network layer; and the reception program receives the test data transmitted from the transmission program on the network layer to determine normality of the network layer of the network.

18. The computer-readable recording medium as claimed in claim 13, wherein said testing device to specially test the network is connected to a device to be tested through the network so that the normality of the network is tested together with the device to be tested.

* * * * *

UNITED STATES PATENT AND TRADEMARK OFFICE
CERTIFICATE OF CORRECTION

PATENT NO. : 6,751,761 B1
DATED : June 15, 2004
INVENTOR(S) : Shigeaki Tendo

It is certified that error appears in the above-identified patent and that said Letters Patent is hereby corrected as shown below:

<u>Title page,</u>
Item [56], References Cited, U.S. PATENT DOCUMENTS, delete
"5,838,518 11/1998 Frater ...360/244.5" and add -- 5,737,517 04/1998 Rite et al. --.

Signed and Sealed this

Twenty-first Day of September, 2004

JON W. DUDAS
*Director of the United States Patent and Trademark Office*